United States Patent
Counterman

(10) Patent No.: US 6,647,929 B1
(45) Date of Patent: Nov. 18, 2003

(54) SYSTEM FOR INCREASING EFFICIENCY OF STEAM GENERATOR SYSTEM HAVING A REGENERATIVE AIR PREHEATER

(75) Inventor: Wayne S. Counterman, Wellsville, NY (US)

(73) Assignee: ALSTOM (Switzerland) Ltd, Baden (CH)

( * ) Notice: Subject to any disclaimer, the term of this patent is extended or adjusted under 35 U.S.C. 154(b) by 0 days.

(21) Appl. No.: 10/383,934

(22) Filed: Mar. 7, 2003

(51) Int. Cl.⁷ .............................................. F22B 33/00
(52) U.S. Cl. ................ 122/1 A; 122/DIG. 1; 122/DIG. 2; 165/8; 165/9
(58) Field of Search .............. 122/1 A, DIG. 1, 122/DIG. 2; 165/8, 9

(56) References Cited

U.S. PATENT DOCUMENTS

| | | | | |
|---|---|---|---|---|
| 4,223,640 A | * | 9/1980 | Rochford et al. ............ | 122/1 R |
| 4,403,571 A | * | 9/1983 | Kochey, Jr. ................. | 122/1 A |
| 5,915,339 A | * | 6/1999 | Cox et al. ................... | 122/1 A |
| 5,915,340 A | * | 6/1999 | Cronin et al. ................ | 122/1 A |
| 6,145,582 A | * | 11/2000 | Bolle et al. .................. | 165/10 |
| 6,155,209 A | * | 12/2000 | Finnemore .................. | 122/1 A |
| 6,227,150 B1 | * | 5/2001 | Finnemore et al. .......... | 122/1 A |
| 6,397,785 B1 | * | 6/2002 | Fierle ......................... | 122/1 A |

* cited by examiner

Primary Examiner—Jiping Lu
(74) Attorney, Agent, or Firm—Russell W. Warnock

(57) ABSTRACT

A method for increasing the efficiency of a steam generator system including a boiler and a regenerative air preheater. The method including determining a reduced rate of acid accumulation in the preheater which may be achieved by injecting an $SO_3$ neutralizing additive material into flue gas generated by the boiler. A new maximum allowable clean condition pressure drop is calculated based on the reduced rate of acid accumulation. Modified heat exchange element baskets are created having an increased heat transfer efficiency, compared to conventional heat exchange element basket assemblies, and a maximum allowable clean condition pressure drop substantially equal to the calculated new maximum allowable clean condition pressure drop. The conventional heat exchange element basket assemblies are replaced with modified heat exchange element basket assemblies. When the boiler is operating, the additive material is added to the flue gas.

20 Claims, 4 Drawing Sheets

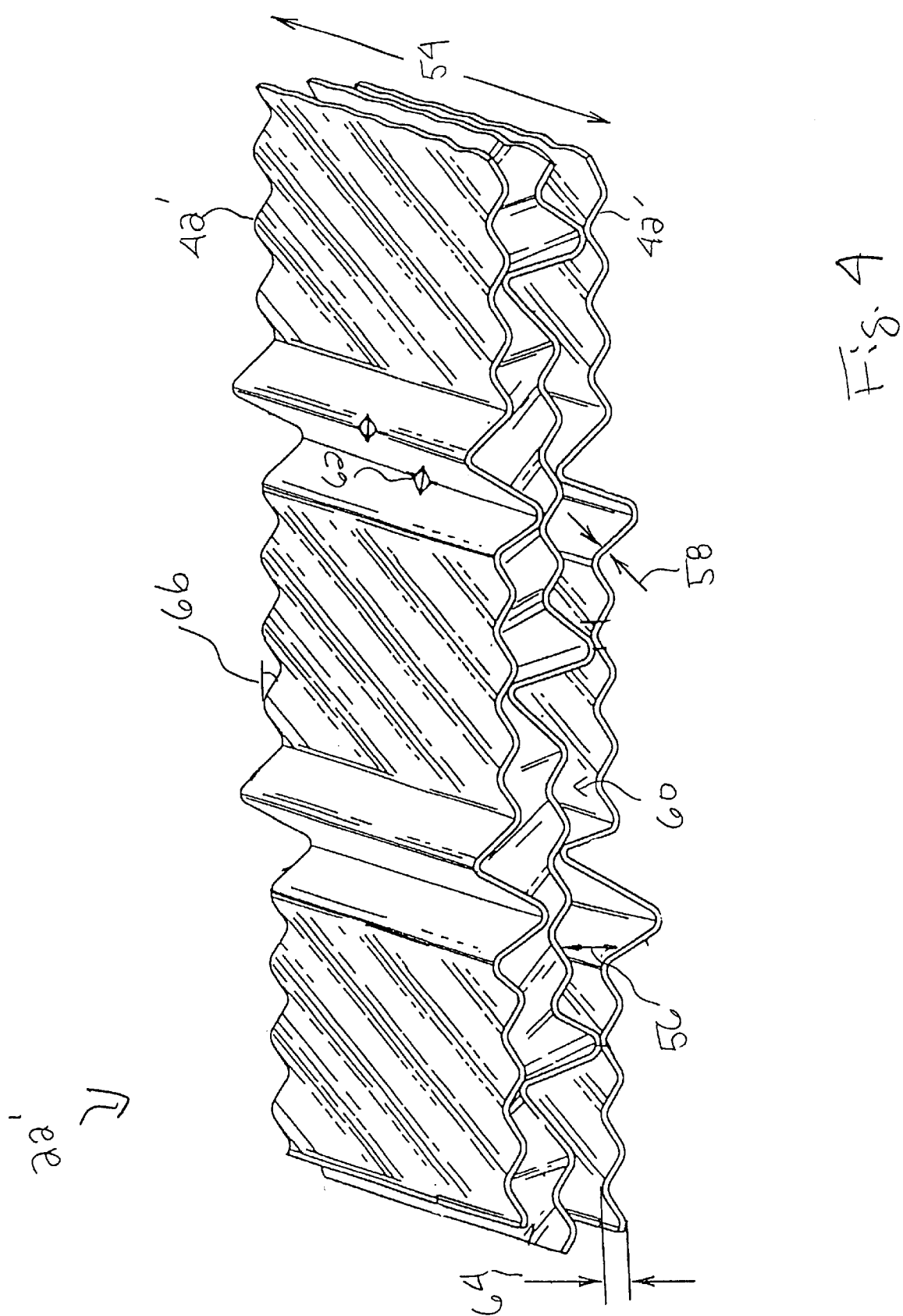

SYSTEM FOR INCREASING EFFICIENCY OF STEAM GENERATOR SYSTEM HAVING A REGENERATIVE AIR PREHEATER

BACKGROUND OF THE INVENTION

This invention relates generally to a steam generating system having a coal or oil fired boiler and a regenerative air preheater. More particularly, the present invention relates to a steam generating system having a boiler and a rotary regenerative air preheater.

During the combustion process in the boiler, the sulfur in the fuel is oxidized to $SO_2$. After the combustion process, some amount of $SO_2$ is further oxidized to $SO_3$, with typical amounts on the order of 1 to 2% going to $SO_3$. The presence of iron oxide, vanadium and other metals at the proper temperature range produces this oxidation. Selective catalytic reduction (SCR) is also widely known to oxidize a portion of the $SO_2$ in the flue gas to $SO_3$. The catalyst formulation (primarily the amount of vanadium in catalyst) impacts the amount of oxidation, with rates ranging from 0.5% to over 1.5%. Most typical is around 1%. Therefore plants firing a high sulfur coal with a new SCR can see a large increase in the $SO_3$ emissions, which produce a visible plume, local acidic ground level problems and other environmental issues.

Regenerative air preheaters condense or trap a portion of the $SO_3$ in the flue gas. The $SO_3$ is condensed as sulfuric acid at temperatures typically below 300° F. Cold end acidic fouling of regenerative air preheaters creates a gradual increase in pressure drop. Sootblowing is generally utilized to reduce the rate of pressure drop build-up, but after some period of operation the air preheater must be cleaned by water washing. This is most typically accomplished by having an outage and shutting down the boiler. The maximum amount of pressure drop increase which is acceptable depends on the limitations of the existing fans, either the forced draft (air side), or induced draft (gas side) fans. The maximum acceptable pressure drop across the air preheater imposes limits on the design of the air preheater, principally limiting the number and type of heat exchange elements, thereby limiting the thermal efficiency of the air preheater.

SUMMARY OF THE INVENTION

Briefly stated, the invention in a preferred form is a method for increasing the efficiency of a steam generator system including a boiler producing a flow of flue gas containing $SO_3$. An air preheater includes an air inlet and a flue gas outlet defining a cold end and a flue gas inlet and an air outlet defining a hot end. The flow of flue gas is received by the flue gas inlet, carried through heat exchange element basket assemblies, and discharged from the flue gas outlet, such that the flow of flue gas creates a pressure drop across the air preheater. A portion of the $SO_3$ carried in the flue gas forms an acid which accumulates in the cold end of the air preheater, with the rate of acid accumulation depending on the amount of $SO_3$ carried in the flue gas. The accumulating acid causes the pressure drop across the air preheater to increase from a maximum allowable clean condition pressure drop to a maximum allowable dirty condition pressure drop over the operating cycle of the steam generator system. The method comprises the steps of determining a reduced rate of acid accumulation which may be achieved by injecting an $SO_3$ neutralizing or $SO_3$ reactant additive material into the flue gas. A new maximum allowable clean condition pressure drop is calculated based on the reduced rate of acid accumulation. Modified heat exchange element baskets are created. The modified baskets have an increased heat transfer efficiency, compared to the conventional heat exchange element basket assembly, and a maximum allowable clean condition pressure drop substantially equal to the calculated new maximum allowable clean condition pressure drop. The conventional heat exchange element basket assemblies are replaced with modified heat exchange element basket assemblies. When the boiler is operating, the additive material is added to the flue gas.

Creating a modified heat exchange element basket includes identifying how the conventional heat exchange element basket assemblies may be modified to increase the heat transfer surface area and heat transfer. The cost of effecting each identified modification is determined. Finally, it is determined which of the identified modifications will most cost effectively produce the new maximum allowable clean condition pressure drop to provide the increased efficiency desired.

The steam generator system also generally includes fans for pushing and pulling the flue gas through the boiler. The maximum output of the limiting fan determines the maximum allowable dirty condition pressure drop ($\Delta P_{max}$). The new maximum allowable clean condition pressure drop may be determined by calculating the increase in the pressure drop over the operating cycle attributable to the reduced rate of acid accumulation and subtracting the increase in the pressure drop over the operating cycle from the maximum allowable dirty condition pressure drop. Alternatively, the new maximum allowable clean condition pressure drop may be determined by calculating the increase percent decrease in acid accumulation over the operating cycle attributable to the reduced rate of acid accumulation (% $\Delta P$) and determining the maximum allowable dirty condition pressure drop with the formula $\Delta P_{max}/(1+\% \Delta P)$.

It is an object of the invention to provide a cost effective steam generating system in which a large percentage of $SO_3$ emitted by the boiler is removed in the installed regenerative air preheater.

It is also an object of the invention to provide a steam generating system in which fouling and corrosion problems associated with $SO_3$ removal are minimized.

Other objects and advantages of the invention will become apparent from the drawings and specification.

BRIEF DESCRIPTION OF THE DRAWINGS

The present invention may be better understood and its numerous objects and advantages will become apparent to those skilled in the art by reference to the accompanying drawings in which:

FIG. 4 is a perspective view of portions of three heat exchange elements of a heat exchange element basket assembly of FIG. 1.

DETAILED DESCRIPTION OF THE PREFERRED EMBODIMENT

The majority of steam generating systems utilize regenerative air preheaters to increase the boiler efficiency, with the largest portion being a rotary regenerative air preheater.

This type of air preheater features rotating heat exchange elements. A different type of regenerative air preheater utilizes fixed heat exchange elements and internally rotating hoods or ductwork fixed to the rigid air and gas ducts. The subject invention relates to boiler systems equipped with either type of regenerative air preheater. To facilitate discussion, the inventive arrangement will be discussed in combination with a rotary regenerative air preheater.

Figure 1:
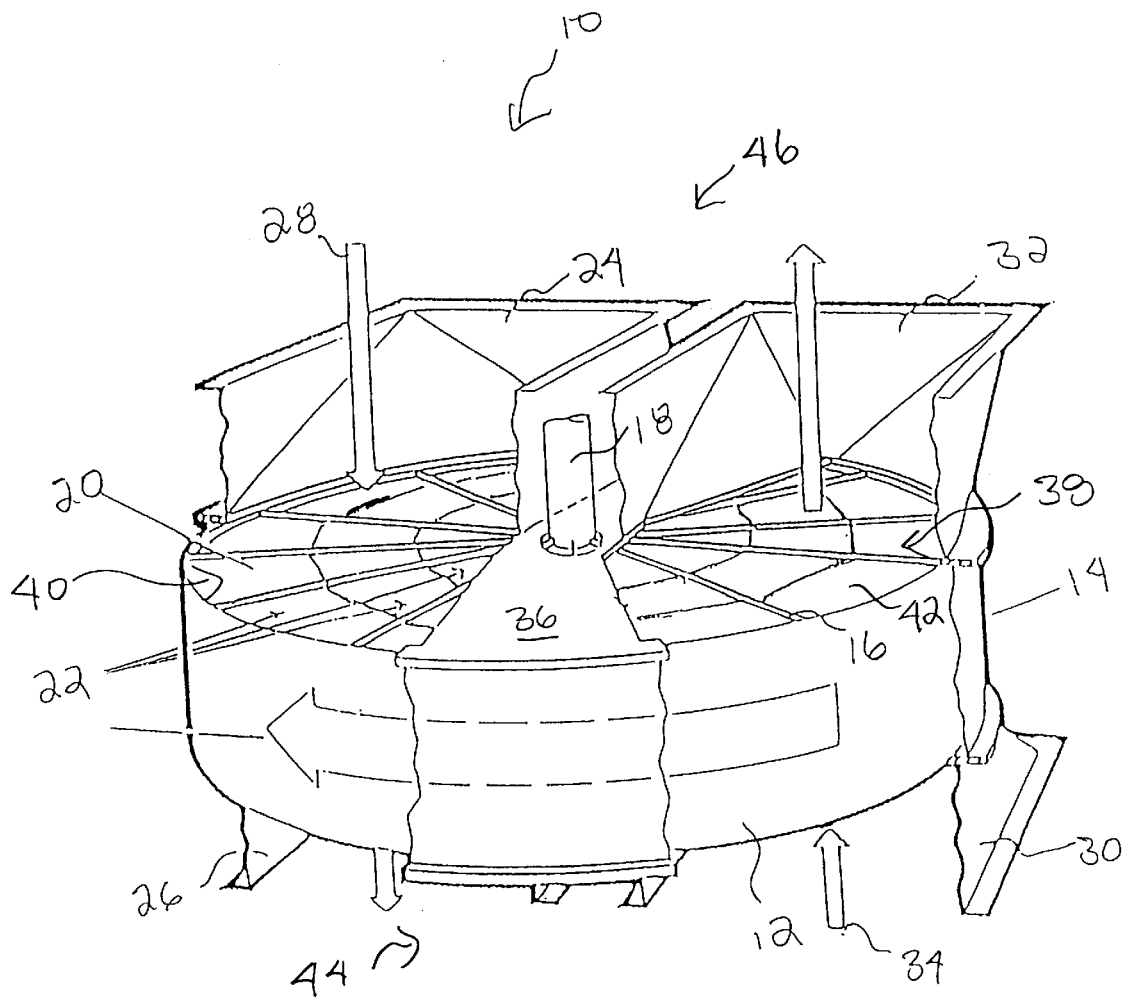
FIG. 1 is a perspective view, partially broken away, of a rotary regenerative air preheater.
Figure 2:
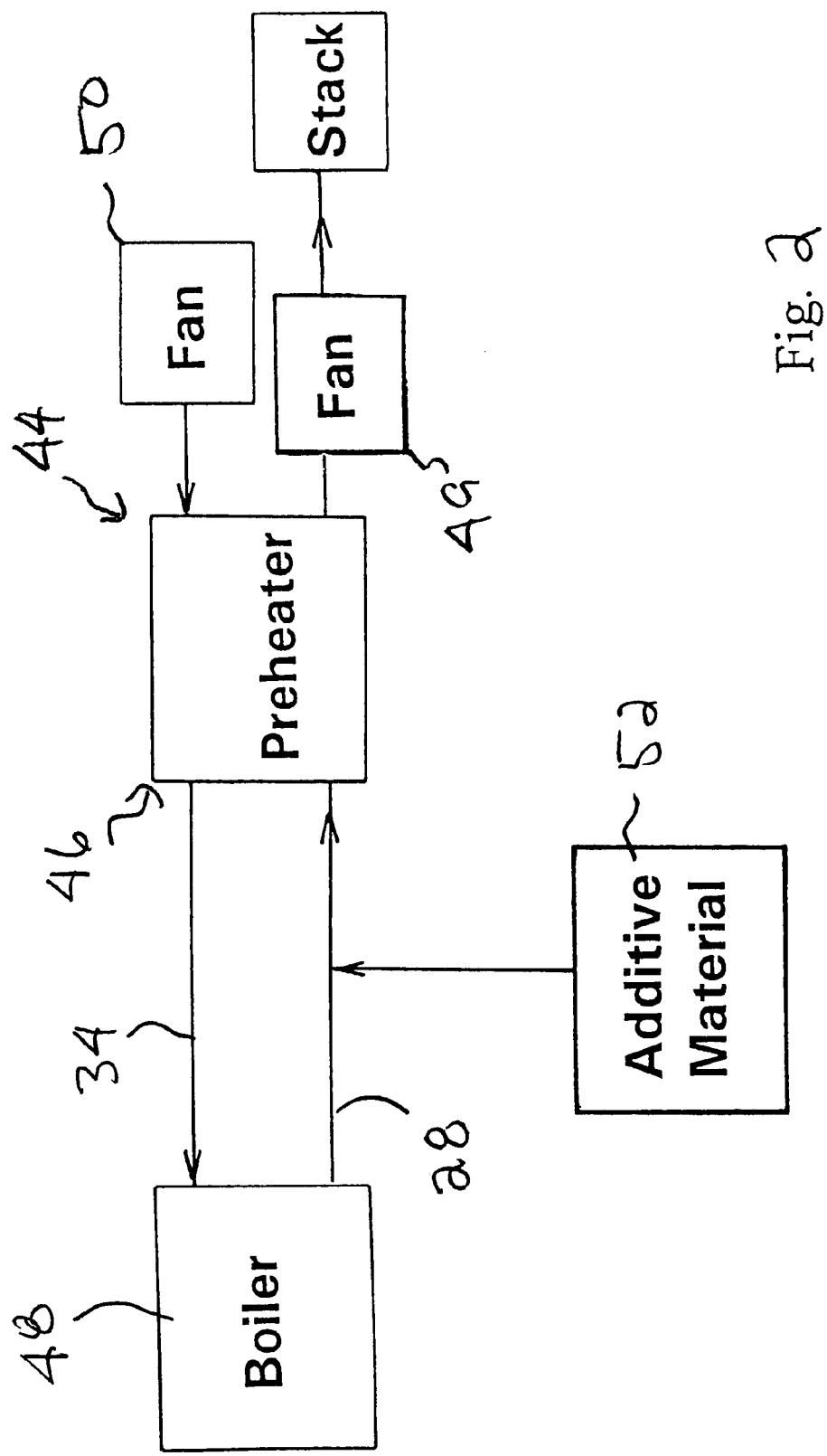
FIG. 2 is a schematic diagram of a system in accordance with the invention.

With reference to FIG. 1 of the drawings, a conventional rotary regenerative preheater is generally designated by the numerical identifier 10. The air preheater 10 has a rotor 12 rotatably mounted in a housing 14. The rotor 12 is formed of diaphragms or partitions 16 extending radially from a rotor post 18 to the outer periphery of the rotor 12. The partitions 16 define compartments 20 therebetween for containing heat exchange element basket assemblies 22.

In a typical rotary regenerative heat exchanger 10, the hot flue gas stream 28 and the combustion air stream 34 enter the rotor 12 from opposite ends and pass in opposite directions over the heat exchange elements 42 housed within the heat exchange element basket assemblies 22. Consequently, the cold air inlet 30 and the cooled flue gas outlet 26 are at one end of the heat exchanger, referred to as the cold end 44, and the hot flue gas inlet 24 and the heated air outlet 32 are at the opposite end of the air preheater 10, referred to as the hot end 46. Sector plates 36 extend across the housing 14 adjacent the upper and lower faces of the rotor 12. The sector plates 36 divide the air preheater 10 into an air sector 38 and a flue gas sector 40. The arrows of FIG. 1 indicate the direction of the flue gas stream 28 and the air stream 34 through the rotor 12. The hot flue gas stream 28 entering through the flue gas inlet duct 24 transfers heat to the heat exchange elements 42 in the heat exchange element basket assemblies 22 mounted in the compartments 20 positioned in the flue gas sector 40. The heated heat exchange element basket assembles 22 are then rotated to the air sector 38 of the air preheater 10. The stored heat of the heat exchange element basket assemblies 22 is then transferred to the air stream 34 entering through the air inlet duct 30. The cold flue gas stream exits the preheater 10 through the flue gas outlet duct 26 and the heated air stream exits the preheater 10 through the air outlet duct 32.

Regenerative air preheaters 10 condense or trap a portion of the $SO_3$ carried in the flue gas. Acidic fouling of the cold end 44 of the air preheater 10 creates a gradual increase in pressure drop across the air preheater 10. Sootblowing is generally utilized to reduce the rate of pressure drop buildup, but after some period of operation the air preheater 10 must cleaned by water washing. This is most typically accomplished during an annual outage when the boiler 48 is shut down.

The amount of pressure drop increase which is acceptable depends on the most limiting of either the forced draft (air side) fan(s) 49, or induced draft (gas side) fan(s) 50. The design of the heat exchange element basket assemblies 22 must account for the increase in pressure drop over the twelve month period between outages. That is, the number, size, and/or type of heat exchange elements 42 carried in the basket assemblies 22 is in part set by the value of the pressure drop across the air preheater 10 in the clean condition. For example, if a maximum pressure drop of 8 inches is allowed by the limiting fan 49 or 50 and the acidic fouling will cause the pressure drop to double over the twelve month period, the maximum allowable pressure drop of the air preheater 10 in the clean condition is 4 inches. A heat exchange element basket assembly 22 for such an air preheater 10 will include fewer heat exchange elements 42 and/or heat exchange elements 42 which are less efficient in transferring heat than a heat exchange element basket assembly 22 which may sustain a greater pressure drop in the clean condition.

In a system for increasing efficiency of steam generator system having a regenerative air preheater 10, an additive material 52 is injected into the hot flue gas stream 28 to remove or significantly reduce the amount of $SO_3$ prior to the cold end 44. The $SO_3$ reaction may occur prior to the hot end 46, or during the temperature reduction within the heat exchange elements 42 (but prior to the heat exchange elements 42 reaching the acidic condensation temperature), or some combination of the two. Such additive materials 52 include solutions containing a bisulfite, or a sulfite. Alternatively, the additive material 52 may be an alkaline sorbent such as magnesium oxide or calcium oxide.

Reducing the amount of $SO_3$ reduces the rate of cold end acidic fouling, thereby reducing the rate of increase in the pressure drop and consequently reducing the pressure drop across the air preheater 10 at the end of the twelve month period (or any desired design time period) of the operating cycle. The limiting fan 49 or 50 will therefore have additional capacity which can be used to allow a revision in the heat exchange elements 42 that increases the efficiency of such elements 42 while increasing the pressure drop attributable to the heat exchange elements 42. Addition of the additive material 52 produces a significant reduction in the rate of pressure drop increase, for example by at least by 25%.

The efficiency of the air preheater 10 is increased, thereby increasing the efficiency of the entire steam generator system, by replacing some or all of the existing heat exchange elements 42 with new, more efficient, heat exchange elements 42'. As explained above, the new heat exchange elements 42' generate a greater pressure drop in the air/gas flow. Accordingly, the total increase in the pressure drop attributable to the new heat exchange elements 42' is set to be equal to or less than the reduction in pressure drop attributable to the reduction in acidic fouling of the cold end 44. In this manner, the total pressure drop across the air preheater 10 at the end of the design period between steam generator system outages will be the same as the total pressure drop for a conventional steam generator system having equivalent pressure drop limitations.

For example, if the additive material 52 injected into the hot flue gas steam 28 produces a twenty-five percent (25%) reduction in acidic fouling of the cold end 44 of an air preheater 10 having a 4 inch pressure drop in the clean condition, the increase in pressure drop over the operating cycle will be 3 inches (25% less than the 4 inch increase discussed above), providing a total pressure drop across the air preheater 10 at the end of the operating cycle of 7 inches. Accordingly, more efficient heat exchange elements 42' may be substituted for the conventional heat exchange elements 42. The allowable clean condition pressure drop of the "improved" air preheater 10 may be determined by the following formula:

$$\Delta P_{max}/(1+\% \ \Delta P \ \text{increase})$$

Where $\Delta P_{max}$ is the maximum allowable pressure drop at the end of the operating cycle and % $\Delta P$ increase is the percentage increase in pressure drop over the operating cycle after addition of the additive material 52. For the example above, the allowable clean condition pressure drop would therefore be $$8 \ \text{inches}/(1+0.75)=4.57 \ \text{inches}$$

With an initial, clean condition pressure drop of 4.57 inches, a pressure drop increase of seventy-five percent (75%) over twelve months produces 8 inches of pressure drop, leaving no excess fan capacity.

The efficiency of a heat exchange element basket assembly 22 may be increased in a number of ways. The area of the surface available for transferring heat may be increased by increasing the depth or flow length 54 of the heat exchange elements 42' (FIG. 4) within a basket assembly 22 by using a special basket design that provides a greater total depth 54 for the heat exchange elements 42' by reducing the space occupied by supports and/or handling bars. The spacing 56 between the heat exchange elements 42' may be reduced and/or the thickness 58 of the sheet material forming the heat exchange elements 42' may be reduced to allow the basket assembly 22 to contain a greater number of heat exchange elements 42'. Heat exchange elements 42' may be used which have a larger length factor. Although costly, the rotor 12 may be modified to provide for a greater depth 54 for the heat exchange elements 42'. The design of the rotor 12 may also be modified to reduce the number of layers of heat exchange element basket assemblies 22, thereby reducing the number of support bars and also reducing rotor volume attributable to clearance gaps.

The efficiency may also be increased by increasing the heat transfer coefficient of the heat exchange element basket assemblies 22. The heat transfer coefficient of a basket assembly 22 may be increased by lowering the porosity, for example by increasing the number of heat exchange elements 42'. Increasing the number of heat exchange elements 42' in a basket assembly 22 not only increases the total surface for heat exchange, it decreases the total flow area 60 resulting in a higher flow velocity and a higher heat transfer coefficient. The heat exchange elements 42' may have a rougher heat transfer surface to produce turbulence in the flow. Heat exchange element features such as indentations 62 on notches, a greater undulation height 64, or a steeper undulation angle 66 may be used to roughen the surface. Alternatively, the heat exchange elements 42' may include flow interrupters or boundary layer trips (e.g. punched tabs or expanded metal) to produce turbulence in the flow.

It should be appreciated that reducing the thickness 58 of the sheet material from which the heat exchange elements 42' are manufactured will increase the porosity of the basket assembly 22 in the absence other changes to the basket assembly design. That is, the thinner heat exchange elements 42' create a larger flow area 60, producing a lower flow velocity.

Figure 3:
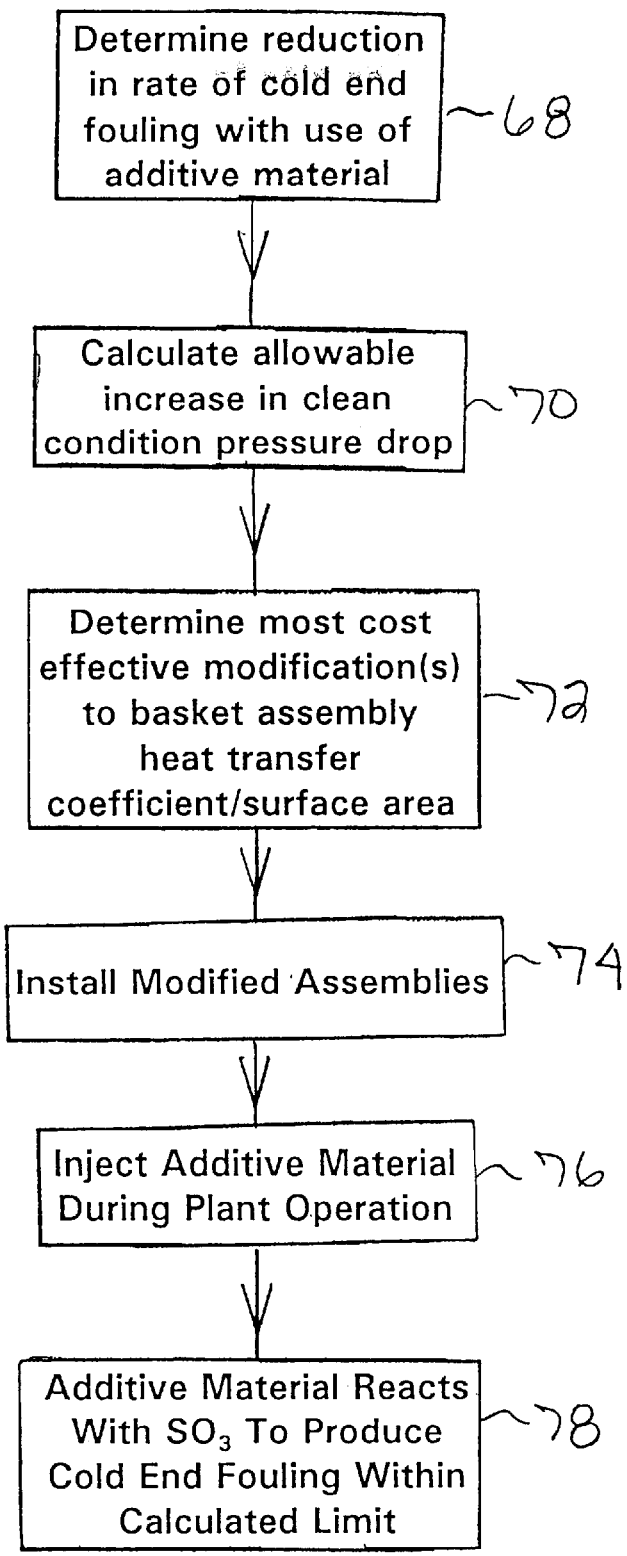
FIG. 3 is a flow diagram of a method for increasing the efficiency of the air preheater of FIG. 1.

In summary, the efficiency of a regenerative air preheater 10 may be increased by first determining 68 the reduction in the rate of cold end fouling which may be achieved by injecting an additive material 52 into the hot flue gas stream 28 that reduces the amount of $SO_3$ which may be retained in the cold end 44 of the air preheater 10 (FIG. 3). For a given reduction in the rate of fouling, a new allowable clean condition pressure drop is calculated 70. The various ways of increasing the heat transfer surface area and the heat transfer coefficient for the particular preheater design are evaluated to determine 72 which modifications to the heat exchange element basket assembly design will most cost effectively produce the calculated clean condition pressure drop and thereby increase the heat transfer efficiency. Heat exchange element basket assemblies 22' incorporating the selected modifications are installed 74 in the air preheater 10. During operation of the steam generating system, additive material 52 is injected 76 into the flue gas stream 28 proximate to the flue gas inlet duct 24. The additive material 52 reacts 78 with the $SO_3$ present in the flue gas stream 28 such that the amount of acid produced and deposited in the cold end 44 is substantially equal to the amount calculated in step 68.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A method for increasing the efficiency of a steam generator system including a boiler and an air preheater; the boiler producing a flow of flue gas containing $SO_3$; the air preheater including an air inlet, a flue gas outlet defining a cold end and a flue gas inlet and an air outlet defining a hot end, and a plurality of conventional heat exchange element basket assemblies; the flow of flue gas being received by the flue gas inlet, carried through the heat exchange element basket assemblies, and discharged from the flue gas outlet, whereby the flow of flue gas creates a pressure drop across the air preheater; at least a portion of the $SO_3$ carried in the flue gas forming an acid and accumulating in the cold end of the air preheater, the rate of acid accumulation depending on the amount of $SO_3$ carried in the flue gas, whereby the pressure drop across the air preheater increases from a maximum allowable clean condition pressure drop to a maximum allowable dirty condition pressure drop over an operating cycle of the steam generator system; the method comprising the steps of:

determining a reduced rate of acid accumulation achievable by injecting an $SO_3$ neutralizing additive material into the flue gas;

calculating a new maximum allowable clean condition pressure drop based on the reduced rate of acid accumulation;

creating a modified heat exchange element basket having an increased heat transfer efficiency compared to the conventional heat exchange element basket assembly and a maximum allowable clean condition pressure drop substantially equal to the calculated new maximum allowable clean condition pressure drop;

replacing the conventional heat exchange element basket assemblies with modified heat exchange element basket assemblies; and adding the additive material to the flue gas when the boiler is operating.

2. The method of claim 1 wherein the step of creating a modified heat exchange element basket includes the substeps of:

identifying how the conventional heat exchange element basket assemblies may be modified to increase the heat transfer surface area;

identifying how the conventional heat exchange element basket assemblies may be modified to increase the heat transfer;

determining the cost of effecting each identified modification determining which of the identified modifications will most cost effectively produce the new maximum allowable clean condition pressure drop.

3. The method of claim 1 wherein the step of adding the additive material includes injecting the additive material into the flow of flue gas proximate to the flue gas inlet.

4. The method of claim 1 wherein the additive material is a solution containing a bisulfite or a sulfite.

5. The method of claim 1 wherein the additive material is an alkaline sorbent.

6. The method of claim 1 wherein the alkaline sorbent is magnesium oxide or calcium oxide.

7. The method of claim 1 wherein the steam generator system also includes a limiting fan for pushing or pulling the flue gas through the boiler, the limiting fan having a maximum output that determines the maximum allowable dirty condition pressure drop, the step of calculating a new maximum allowable clean condition pressure drop comprising the sub-steps of:

calculating the increase in the pressure drop over the operating cycle attributable to the reduced rate of acid accumulation and subtracting the increase in the pressure drop over the operating cycle from the maximum allowable dirty condition pressure drop.

8. The method of claim 1 wherein the steam generator system also includes a limiting fan for pushing or pulling the flue gas through the boiler, the limiting fan having a maximum output that determines the maximum allowable dirty condition pressure drop ($\Delta P_{max}$), the step of calculating a new maximum allowable clean condition pressure drop comprising the sub-steps of:

calculating the increase percent decrease in acid accumulation over the operating cycle attributable to the reduced rate of acid accumulation (% $\Delta P$)

determining the maximum allowable dirty condition pressure drop with the formula $\Delta P_{max}/(1+\% \Delta P)$.

9. The method of claim 1 wherein each heat exchange element basket assembly includes a plurality of heat exchange elements, the step of creating a modified heat exchange element basket including increasing the depth or flow length of the heat exchange elements.

10. The method of claim 1 wherein each heat exchange element basket assembly includes a plurality of spaced heat exchange elements, the step of creating a modified heat exchange element basket including reducing the spacing between the heat exchange elements.

11. The method of claim 1 wherein each heat exchange element basket assembly includes a plurality of heat exchange elements, each of the heat exchange elements having a thickness, the step of creating a modified heat exchange element basket including the sub steps of:

reducing the thickness of the heat exchange elements to provide thin heat exchange elements and inserting more thin heat exchange elements into the heat exchange element basket assembly.

12. The method of claim 1 wherein each heat exchange element basket assembly includes a plurality of spaced heat exchange elements, each of the heat exchange elements having a length factor, the step of creating a modified heat exchange element basket including increasing the length factor of the heat exchange elements.

13. The method of claim 1 wherein each heat exchange element basket assembly includes a plurality of spaced heat exchange elements, the step of creating a modified heat exchange element basket including lowering the porosity of the heat exchange element basket assemblies.

14. The method of claim 1 wherein each heat exchange element basket assembly includes a plurality of exchange elements, each of the heat exchange elements having a heat exchange area, the step of creating a modified heat exchange element basket including increasing the heat exchange area of the heat exchange elements.

15. The method of claim 1 wherein each heat exchange element basket assembly has a flow area, the step of creating a modified heat exchange element basket including decreasing the flow area within a heat exchange element basket assembly.

16. The method of claim 1 wherein each heat exchange element basket assembly includes a plurality of exchange elements, each of the heat exchange elements having a pair of oppositely opposed heat exchange surfaces, the step of creating a modified heat exchange element basket including roughening the heat exchange surfaces of the heat exchange elements.

17. The method of claim 1 wherein each heat exchange element basket assembly includes a plurality of exchange elements, the step of creating a modified heat exchange element basket including adding notches and indentations to the heat exchange elements.

18. The method of claim 1 wherein each heat exchange element basket assembly includes a plurality of exchange elements, each of the heat exchange elements having a plurality of undulations, each of the undulations having a height, the step of creating a modified heat exchange element basket including increasing the height of the undulations.

19. The method of claim 1 wherein each heat exchange element basket assembly includes a plurality of exchange elements, each of the heat exchange elements having a plurality of undulations, each of the undulations having an undulation angle, the step of creating a modified heat exchange element basket including increasing the undulation angle of the undulations.

20. The method of claim 1 wherein each heat exchange element basket assembly includes a plurality of exchange elements, the step of creating a modified heat exchange element basket including adding boundary layer trips to the heat exchange elements.

\* \* \* \* \*